US009406198B2

(12) United States Patent
Bramble

(10) Patent No.: US 9,406,198 B2
(45) Date of Patent: Aug. 2, 2016

(54) JACKPOT CONTROLLER AND A METHOD OF PROVIDING A JACKPOT FOR A GAMING MACHINE

(71) Applicant: Aristocrat Technologies Australia Pty Limited, North Ryde, NSW (AU)

(72) Inventor: Paul Francis Jason Bramble, St Leonards (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 311 days.

(21) Appl. No.: 14/105,959

(22) Filed: Dec. 13, 2013

(65) Prior Publication Data

US 2014/0106871 A1 Apr. 17, 2014

Related U.S. Application Data

(63) Continuation of application No. 12/843,945, filed on Jul. 27, 2010, now Pat. No. 8,608,555.

(30) Foreign Application Priority Data

Jul. 27, 2009 (AU) ................................ 2009903515

(51) Int. Cl.
*A63F 13/00* (2014.01)
*G07F 17/32* (2006.01)

(52) U.S. Cl.
CPC ................................ *G07F 17/3258* (2013.01)

(58) Field of Classification Search
CPC G07F 17/3244; G07F 17/3258; G07F 17/326
USPC ........................................ 463/16, 20, 25, 26
See application file for complete search history.

(56) References Cited

U.S. PATENT DOCUMENTS 5,941,773 A 8/1999 Harlick
6,712,695 B2 3/2004 Mothwurf et al.
6,966,834 B1 11/2005 Johnson
7,056,215 B1 6/2006 Olive

FOREIGN PATENT DOCUMENTS

WO 01/10523 A1 2/2001
WO 2004/064959 A1 8/2004
WO 2005/107914 A1 11/2005

*Primary Examiner* — James S McClellan
(74) *Attorney, Agent, or Firm* — Armstrong Teasdale LLP

(57) ABSTRACT

The invention generally relates to gaming machines and methods implemented with use of a gaming machine. A prize awarded on a gaming device is awarded by obtaining a turnover value for at least one gaming device over a period of time, calculating a probability value based on the turnover value and using the probability value to determine whether the prize is to be awarded. In some implementations there may be two prizes that are awarded with different probabilities when the gaming machine system is in different configurations.

14 Claims, 6 Drawing Sheets

JACKPOT CONTROLLER AND A METHOD OF PROVIDING A JACKPOT FOR A GAMING MACHINE

RELATED APPLICATIONS

This application is a continuation of U.S. patent application Ser. No. 12/843,945, filed Jul. 27, 2010, which claims priority to Australian Application No. 2009903515, filed Jul. 27, 2009. The above-identified applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention generally relates to gaming machines and methods of gaming. A particular embodiment of the present invention relates to gaming machines and methods of gaming that award jackpot prizes.

Gaming venue operators continuously look for new variations and types of games in order to attract both new and return customers to their venues. In response to this need, suppliers of gaming devices and systems have attempted to provide the sought after variety, while still developing games that comply with the relevant regulations in the jurisdiction of the gaming venue operator. Suppliers of gaming devices therefore are faced with restrictions on the types of games and gaming machines that are allowable, both in terms of the prevailing regulations and in terms of providing a return on investment to the gaming venue operators.

One method that has been used with gaming machines is to offer a jackpot prize. A jackpot prize may be funded through gaming activity on the gaming machine, for example by taking a percentage of all wagers placed on the gaming machine. The jackpot prize is awarded on the occurrence of a jackpot prize winning event. Various methods of contribution to a jackpot prize and determination of when the jackpot prize is to be awarded have been developed.

A problem with jackpot prizes is finding an appropriate method of determining how to award the jackpot prize. A compromise typically needs to be reached between awarding large jackpot prizes infrequently and awarding smaller jackpot prizes relatively frequently. Selecting the right combination of prize size and frequency of award may present a difficult choice. A choice is required from a range of jackpot values, probabilities and returns in order to achieve desired jackpot sizes and frequencies. Any particular choice may be a compromise between the diverse requirements of different players.

BRIEF SUMMARY OF THE INVENTION

According to one aspect of the invention, there is provided a method for facilitating an award of a prize on a gaming device, the method comprising the steps of:

obtaining a turnover value for at least one gaming device over a period of time;

calculating a probability value based on the turnover value; and using the probability value to determine whether the prize is to be awarded.

According to another aspect of the invention, there is provided a method of awarding a jackpot, the method including setting a trigger event dependent on a required frequency of award of a jackpot, determining the value of at least two jackpots, and when the trigger event occurs selecting one of the jackpots to award, wherein the probability distribution between the jackpots is variable and determined dependent on a measure of turnover over a previous period.

According to another aspect of the invention, there is provided a gaming machine or system including a jackpot controller programmed to perform the method of the preceding paragraph and/or embodiments of the method described herein. There is also provided instructions stored in electronic storage to program a jackpot controller to perform the method.

According to another aspect of the invention, there is provided a gaming device comprising an electronic processor and a data storage device comprising data, the electronic processor and the data storage device being arranged such that the electronic processor can process the data whereby processing of the data causes the electronic processor to carry out a method for facilitating an award of a prize, the method comprising the steps of:

obtaining a turnover value for at least one gaming machine over a period of time;

calculating a probability value based on the turnover value; and using the probability value to determine whether the prize is to be awarded.

According to a further aspect of the invention, there is provided a gaming machine or system operable to award at least a first and a second jackpot amount wherein:

the first jackpot amount is larger than the second jackpot amount, the gaming machine or system is configurable between at least a first and a second configuration, in the first configuration there is a first probability of award of the first jackpot amount and a second probability of award of the second jackpot, wherein the first probability is larger than the second probability, in the second configuration there is a first probability of award of the first jackpot amount and a second probability of award of the second jackpot, wherein the first probability is smaller than the second probability, wherein the number of jackpot awards in a period for the first and the second each configurations is different and the probabilities and number of awards are constrained to result in a substantially equal amount for the product of number of awards per period and the average jackpot per award.

Further aspects of the present invention will be apparent from the following description, given by way of example and with reference to the accompanying drawings. Also, various embodiments of the aspects described in the preceding paragraphs will be apparent from the appended claims, the following description and/or the accompanying drawings.

As used herein, except where the context requires otherwise, the term "comprise" and variations of the term, such as "comprising", "comprises" and "comprised", are not intended to exclude further additives, components, integers or steps.

DETAILED DESCRIPTION OF THE INVENTION

Figure 1:
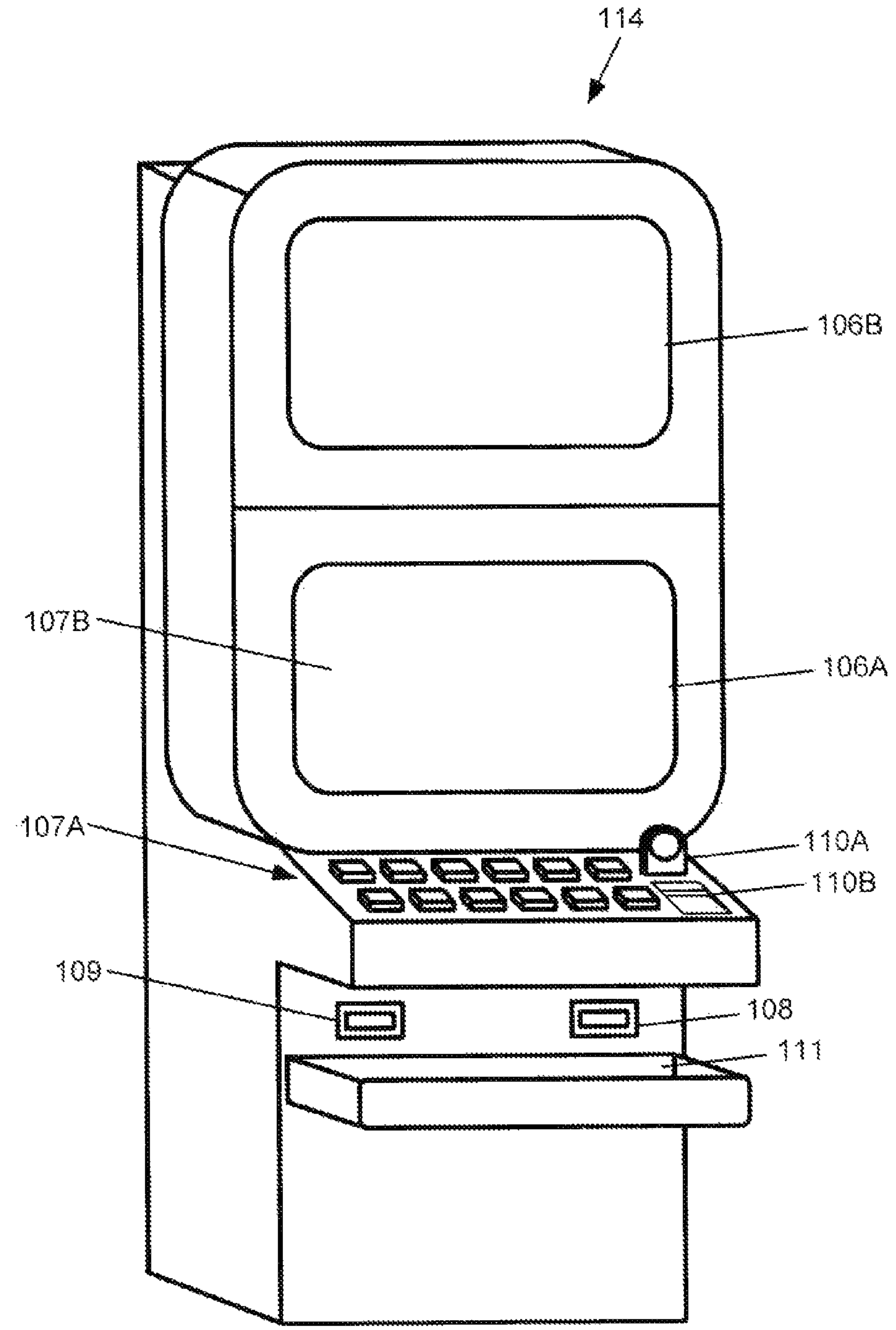
FIG. 1: shows diagrammatically, a view of a gaming console.

In FIG. 1 of the accompanying drawings, one example of a gaming console that is suitable to implement the present invention is generally referenced by arrow 114.

The gaming console 114 includes two displays 106A, 106B on one or both of which is displayed representations of a game that can be played by a player and a bank of buttons 107A and/or a touch screen 1078 to enable a player to play the game. The displays 106 may be video display units, such as a cathode ray tube screen device, a liquid crystal display, plasma screen, any other suitable video display unit, or the visible portion of an electromechanical device. The display 106B may display artwork, including for example, pay tables and details of bonus awards and other information or images relating to the game. In alternative gaming consoles the display 106B may be omitted, optionally replaced by a static display.

A credit input including a coin input 110A and/or bill collector 1108 allows a player to provide credit for wagering and a coin output 111 is provided for cash payouts from the gaming console 114. A card and/or ticket reader 108 and a printer 109 may be provided to provide player tracking, cashless game play or other gaming and non-gaming related functions.

Figure 2:
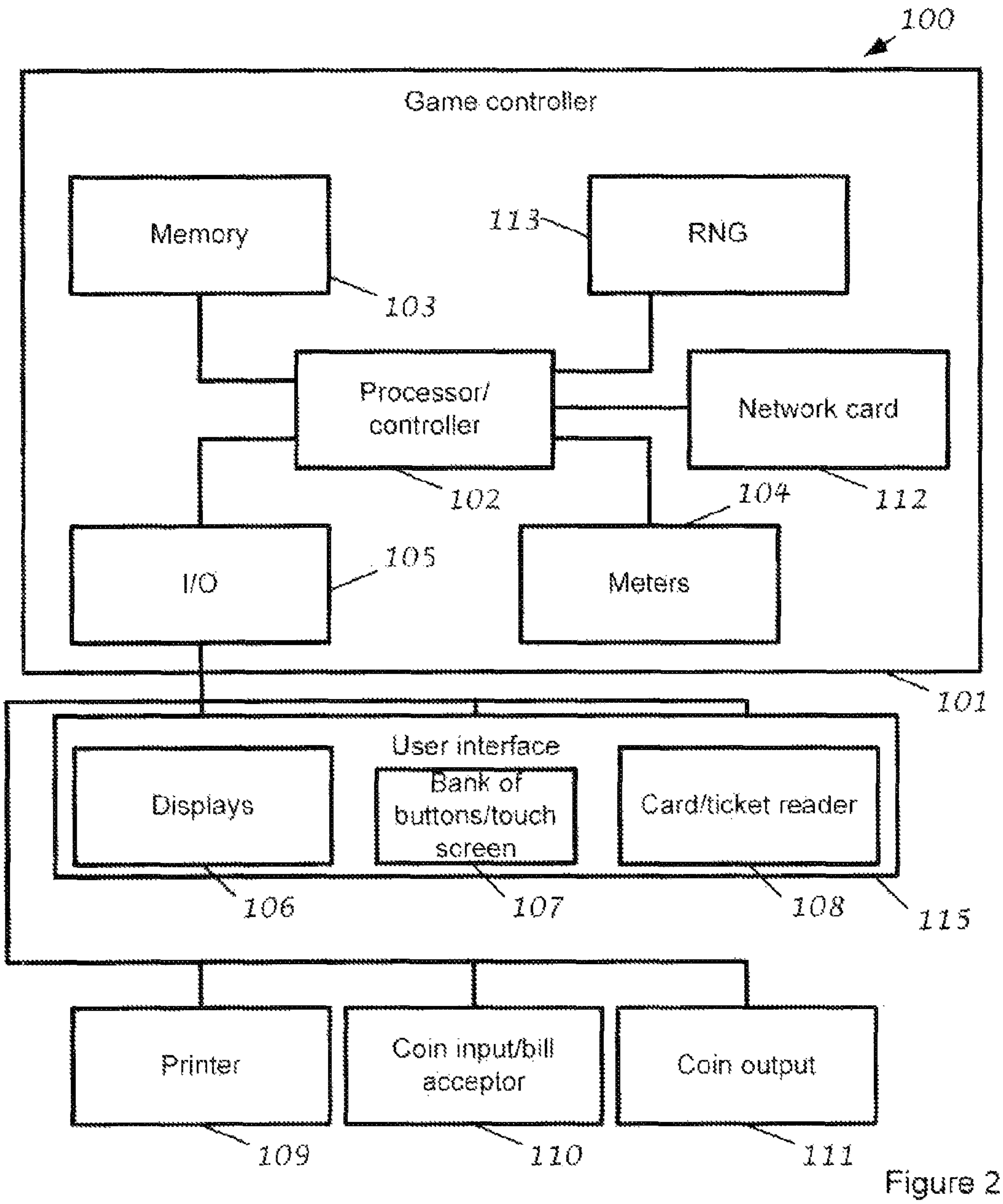
FIG. 2: shows a block diagram of gaming machine.

FIG. 2 shows a block diagram of a gaming machine, generally referenced by arrow 100, suitable for implementing the present invention. The gaming machine 100 may include the gaming console 114 shown in FIG. 1 and accordingly like reference numerals have been used to describe like components in FIGS. 1 and 2.

The gaming machine 100 includes a game controller 101, which in the illustrated example includes a computational device 102, which may be a microprocessor, microcontroller, programmable logic device or other suitable device. Instructions and data to control operation of the computational device 102 are stored in a memory 103, which is in data communication with, or forms part of, the computational device 102. Typically, the gaming machine 100 will include both volatile and non-volatile memory and more than one of each type of memory, with such memories being collectively represented by the memory 103. The instructions to cause the game controller 101 to implement the present invention will be stored in the memory 103.

The game controller 101 may include hardware credit meters 104 for the purposes of regulatory compliance and also include an input/output (I/O) interface 105 for communicating with the peripheral devices of the gaming machine 100. The input/output interface 105 and/or the peripheral devices may be intelligent devices with their own memory for instructions and data.

In the example shown in FIG. 2, the peripheral devices that communicate with the controller are the displays 106, bank of buttons/touch screen 107, the card and/or ticket reader 108, the printer 109, a bill acceptor and/or coin input 110 and a coin output 111. Additional devices may be included as part of the gaming machine 100, or devices omitted as required for the specific implementation.

The bank of buttons 107A and/or touch screen 107B together with one or both of the displays 106 may provide a user interface 115 through which the gaming machine 100 and player communicate. If a card/ticket reader 108 is provided, this may also form part of the user interface 115.

In addition, the gaming machine 100 may include a communications interface, for example a network card 112. The network card 112, may for example, send status information, accounting information or other information to a central controller, server or database and receive data or commands from the central controller, server or database. The network card 112 may also enable communication with a central player account, allowing cashless gaming. One or more of the peripheral devices, for example the card/ticket reader 108 may be able to communicate directly with the network card 112. The network card 112 and the I/O interface 105 may be suitably implemented as a single machine communications interface.

The game controller 101 may also include a random number generator 113, which generates a series of random numbers that are used by the computational device 102 to determine the outcomes of games played on the gaming machine 100.

The game controller 101 may have distributed hardware and software components that communicate with each other directly or through a network or other communication channel. The game controller 101 may also be located in part or in its entirety remote from the user interface 115. Also, the computational device 102 may comprise a plurality of devices, which may be local or remote from each other.

Figure 3:
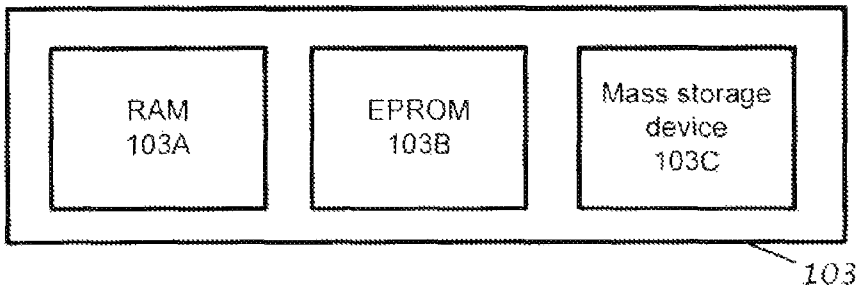
FIG. 3: shows a block diagram of components of the memory of the gaming machine represented in FIG. 2.

FIG. 3 shows an exemplary block diagram of the main components of the memory 103. The RAM 103A typically temporarily holds instructions and data related to the execution of game programs and communication functions performed by the computational controller 102. The EPROM 103B may be a boot ROM device and/or may contain system and game related code. The mass storage device 103C may be used to store game programs, the integrity of which may be verified and/or authenticated by the computational controller 102 using protected code from the EPROM 103B or elsewhere.

Figure 4:
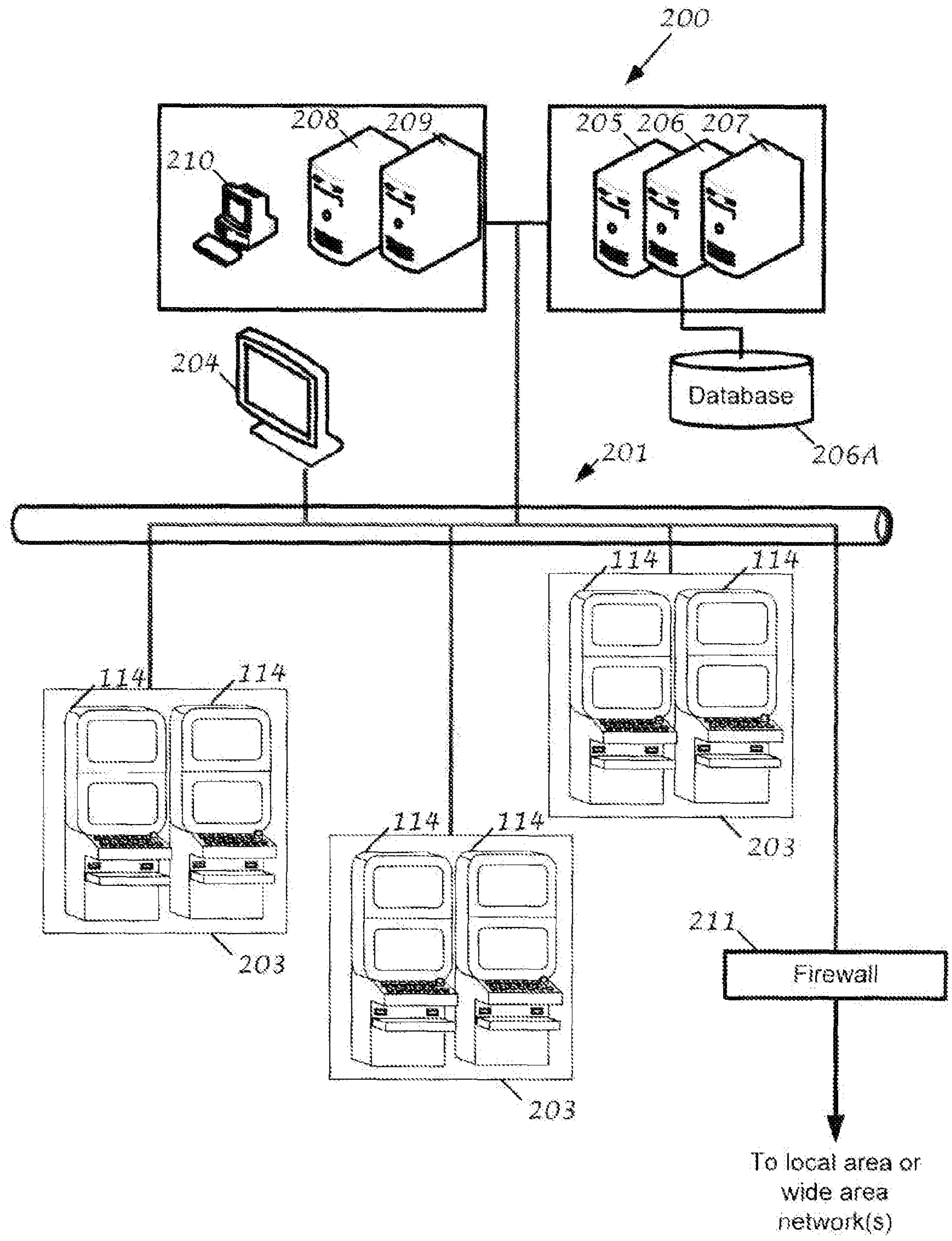
FIG. 4: shows diagrammatically, a network gaming system.

FIG. 4 shows a gaming system 200 in the form of a network of devices. The gaming system 200 includes a network infrastructure 201, which for example may be in the form of an Ethernet network. Alternatively, a wireless network and/or direct communication channels, or a different type of network may be used to link the gaming machines to a server, each other and/or other devices. Gaming consoles 114, shown arranged in three banks 203 of two gaming consoles 114 in FIG. 4, are connected to the network infrastructure 201. The gaming consoles 114 may form part or all of a gaming machine 100. Single gaming consoles 114 and banks 203 containing three or more gaming devices 202 may also be connected to the network infrastructure 201, which may also include bank controllers, hubs, routers, bridges to other networks and other devices (not shown).

One or more displays 204 may also be connected to the network 201. The displays 204 may, for example, be associated with a bank 203 of gaming consoles 114. The displays 204 may be used to display representations associated with game play on the gaming devices 202, and/or used to display other representations, for example promotional or informational material.

Servers may also be connected to the network 201. For example, a game server 205 may generate game outcomes for games played on one or more of the gaming consoles 114, a database management server 206 may manage the storage of game programs and associated data in a database 206A so that they are available for downloading to, or access by, game controllers 101, and a jackpot server 207 may control one or more jackpots for the gaming system 200.

Further servers may be provided to assist in the administration of the gaming system 200, including for example a gaming floor management server 208, and a licensing server 209 to monitor the use of licenses to particular games. An administrator terminal 210 is provided to allow an administrator to manage the network 201 and the devices connected to the network. The different servers depicted can be distinct physical servers or logically distinct server processes running on a single physical server.

It will be appreciated that controllers other than servers may be used for any of the servers shown in FIG. 4. The servers may be programmed by instructions stored on suitable media, for example a compact disc, or communicated to the server through an appropriate communication channel.

The gaming system 200 may communicate with other gaming systems, other local networks, for example a corporate network and/or a wide area network such as the Internet through a firewall 211.

Figure 5:
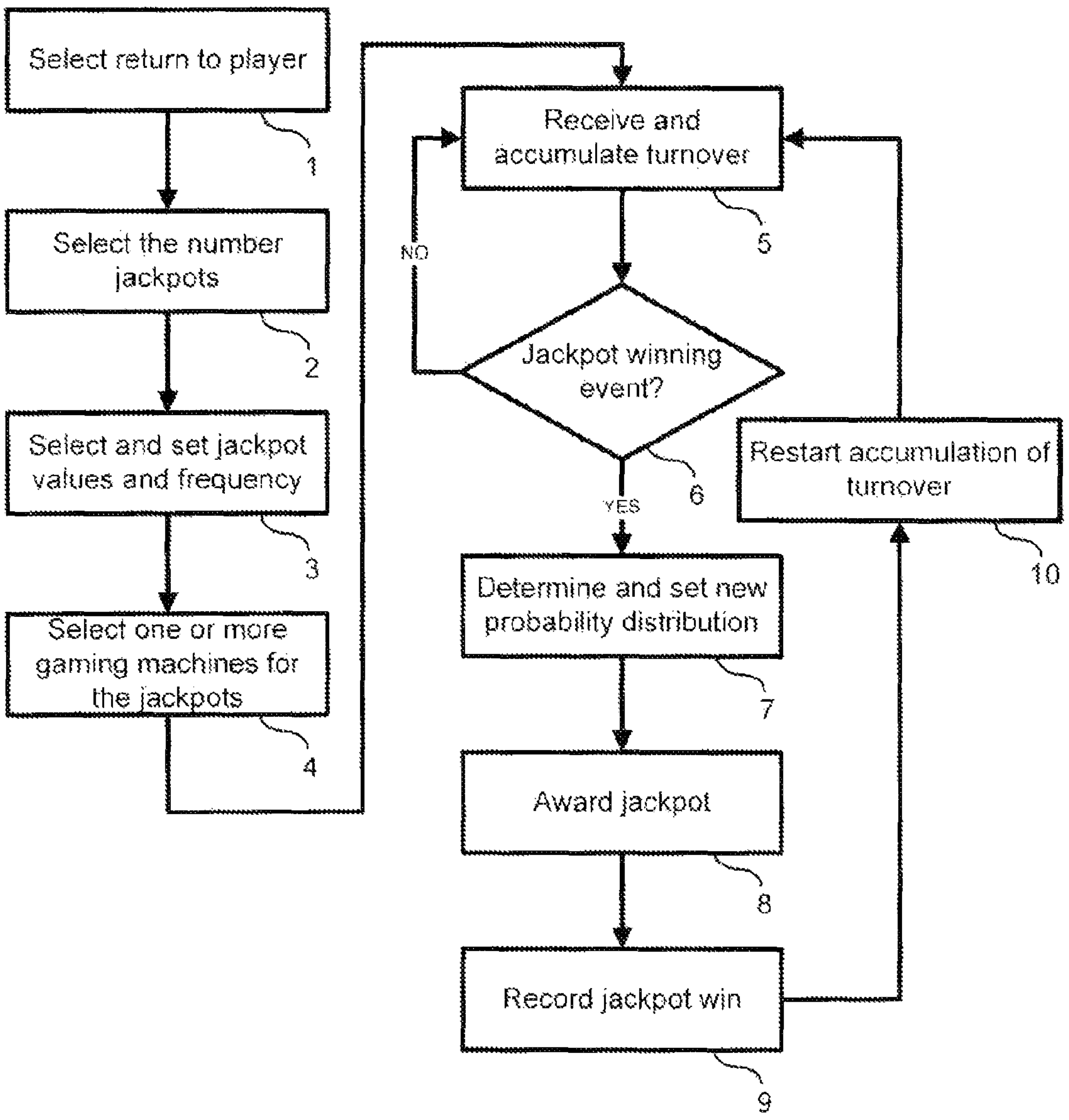
FIG. 5: shows a flow diagram of a method performed in accordance with an embodiment of the present invention.

FIG. 5 shows a process flow diagram of a method performed in accordance with an embodiment of the present invention. The method may be performed by the gaming system 200, in which the gaming consoles 114 each include game controllers 101 to form gaming machines 100 and the following description assumes this implementation. However, those skilled in the relevant arts will appreciate that the method will also be able to be implemented by other gaming systems. The method may also be performed for a standalone gaming system of a group of linked gaming machines linked through dedicated communications channels.

FIG. 5 shows a combination of a method to establish a gaming machine or system with jackpot prizes and a method to operate the gaming machine or system once it has been established. The method of operating the gaming machine or system may be implemented in isolation of the steps to establish the gaming machine system, after the gaming machine or system has been established. Although the steps shown in FIG. 5 are in a particular order, it will be appreciated that some variations may be made to the order without affecting the effect of the method.

For the purposes of explanation, it is assumed that the jackpot awarding method is controlled predominantly by the jackpot server 207. However, some or all of the functions described herein as performed by the jackpot server 207 may be performed by another device in the gaming system 200 or by a functionally equivalent device in a different gaming system.

One type of jackpot award method that may be utilised in the method shown in FIG. 5 is to provide a feature game. In this context, a feature game means that an event (a 'trigger event') on a gaming machine leads to one of two or more possible outcomes according to a selection method involving a random aspect to it. There may or may not be images, sounds and/or other player interaction to represent the selection method. If images are provided, for example on a display 106 of a gaming console 114, then these images may be controlled by the jackpot server 207 or by the game controller 101, which may either determine the result of the feature game itself or receive notice of the result from the jackpot server 207. Where the game controller 101 determines the result of the feature game itself, then it may receive the probability distribution for the jackpots (see herein below) from the jackpot server 207.

For this type of jackpot award method, a jackpot award trigger event can result in any one of a plurality of jackpots being awarded. For example, if the jackpots are a $100 mini jackpot and a $100,000 major jackpot, for an expected average turnover of $10,990 between jackpot trigger events, each trigger event may provide a 99% chance of winning the $100 jackpot and a 1% chance of winning the $100,000 jackpot. If there was an average turnover of $10,990 per day, then there would be one jackpot award per day. Absent the method described herein below in relation to FIG. 5, the higher the turnover, the higher the frequency of jackpot awards and the lower the turnover the lower the frequency of jackpot awards.

The gaming console 114 that caused the trigger event may be awarded the jackpot. Alternatively, when the triggering event occurs, a random determination may be made from the gaming consoles 114 that are currently being played as to which one wins the jackpot. Again, absent the method described below, the frequency of jackpot awards is directly related to the rate of turnover.

Steps 1 to 5 show a method to establish a jackpot for a gaming system. This may involve configuring the jackpot server 207, which includes a program executable within the server that implements the method shown in FIG. 5.

In step 1, the gaming venue operator or designer of the gaming system selects the return to player that the jackpots are to provide. For example, the gaming venue operator or designer of the gaming system may select a return to player of 10%, in which case on average, for every $1000 of turnover, then $100 is caused to be awarded by the jackpot server 207.

In steps 2 and 3, the number, value and frequency of the jackpots is selected. The number of jackpots, value of the jackpots and frequency of the jackpots may all be fixed, or subject to some operational constraints set by a gaming venue operator using a user interface to the jackpot server 207, for example the administrator terminal 210.

The minimum number of jackpots is two. The frequency of the jackpots could vary widely, for example from one every ½ hour, one every day through to one every month. The value of the jackpots would normally be constrained by the return to player selected in step 1 and the number and frequency of the jackpots selected in steps 2 and 3.

For example, if two jackpots, a mini and a major jackpot were selected and the frequency was selected to be an award of one of the two jackpots on a daily basis, then the value of the jackpots may be constrained to satisfy the conditions:

1) Mini jackpot approximately equal to or less than 10% of the minimum turnover in a day; and 2) Major jackpot approximately equal to or greater than 10% of the maximum turnover in a day.

The minimum turnover and maximum turnover in a day may be established using historical information if available, or by experience. If more than two jackpots are selected, then the highest and lowest values may be constrained to satisfy these conditions and there may be substantially no constraints on the value of the other jackpots.

In one embodiment, the jackpot server 207 may dynamically set the values of the jackpots. For example, the highest jackpot could be set at 10% of the highest turnover in a single day over the last month and the lowest jackpot could be set at 10% of the lowest turnover in a single day over the last month. This resetting of the values may occur immediately following the award of one of the jackpots.

Figure 6:
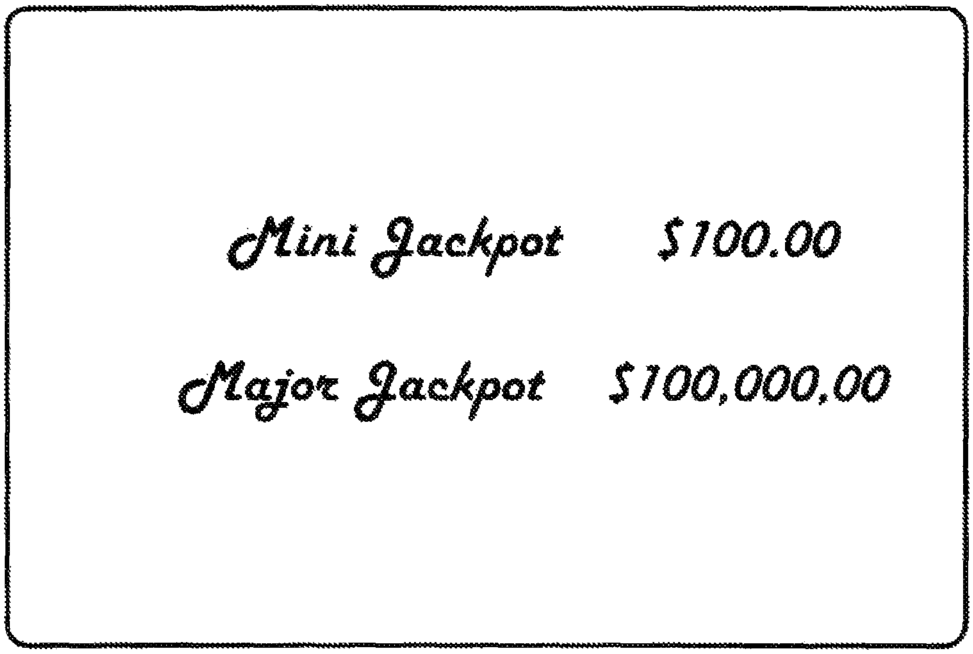
FIG. 6: shows an example screen display of two possible jackpot values.

Typically, the jackpot server 207 will control, either directly or indirectly, one or more displays, for example the display 204, and/or the display 106B to display the jackpots that are available and their respective values. An example display is shown in FIG. 6, which shows an example of the selection of two fixed jackpots, a Mini Jackpot of $100 and a Major Jackpot of $100,000.

If a variable jackpot is selected, the seed value and increment rate of the variable jackpot may be selected to provide a required expected average award size. For example, the jackpots may both be variable, but controlled to award on average $100 and $100,000 respectively.

In step 4, the gaming consoles 114 that are to participate in the jackpot are selected. The selected gaming consoles 114 may be all of the gaming consoles 114 in a single bank 203, all of the gaming consoles in a group of banks 203, all of the gaming consoles 114 in the gaming system 200, or all of the gaming consoles 114 across a plurality of gaming systems. Alternatively, one gaming console 114 may be selected, which may be a standalone gaming machine 100. In another alternative, where each gaming console 114 is individually addressed, any grouping of gaming consoles 114 may be made eligible to win the jackpots.

Following steps 1 to 4, game play of the gaming consoles 114 selected in step 4 is permitted. In step 5, the jackpot server 207 receives signals indicating the turnover on each of the gaming consoles 114 and accumulates this. The accumulated total turnover since the last jackpot award is maintained. In addition, the total turnover since commencement or the last reset of the jackpot system may be maintained. The second counter may be used to track the contribution of the gaming consoles 114 to the jackpots in comparison to the award of the jackpots.

In step 6 the method involves monitoring for a trigger event for the feature game that awards one of the jackpots. This monitoring may be, but is not necessarily, performed by the jackpot server 207. The monitoring may instead by performed by the gaming machines 100. If the trigger event has not occurred, the method returns to step 5. If the trigger event has occurred, the method proceeds to step 7.

In one embodiment, the trigger event is a time-based event. The gaming venue operator has entered the required frequency that a jackpot award should be awarded in step 3. An example is the previously mentioned award of, on average a single jackpot per day. The jackpot controller could then randomly determine a time from a range of selections between 0 and 48 hours, with equal weight. When that time arrives, the next gaming machine to cause an increase in the accumulated turnover monitored in step 5 may be deemed the winner of one of the two jackpots.

In another embodiment, the trigger value for the turnover may be dynamic. To form a dynamic trigger value, use may be made of a type of trigger event that is described in Australian patent number 754689, the entire contents of which are incorporated herein by reference. This type of trigger event involves determining a required turnover between awards on a gaming console 114 and then determining a probability of winning the feature game based on that turnover. While AU 754689 describes determining the turnover on an individual console basis, alternative embodiments that may be used in the method of FIG. 5 determine turnover for group of gaming consoles 114, which may be all of the gaming consoles 114 that are eligible for the same jackpots. If the turnover is monitored for individual consoles, then when a console triggers the feature game, then that same console may win the jackpot that is selected to be awarded. If the turnover is determined for a group of consoles, the console that wins the award may be the gaming console 114 that next causes an increase in the turnover monitored in step 5.

The jackpot controller may determine the turnover over a previous period of play, for example over the last 10 minutes and if the feature game was to be awarded once a day, calculate the total daily turnover if that rate was continued throughout the day. For example, if the turnover was $200 in the previous 10 minutes, then the forecast daily turnover is $28800. Each unit wager, for example $1, that is currently being played would then have a 1 in 28800 chance of triggering the feature game that awards one of the jackpots. If the turnover decreased to $100 over the next ten minutes, then each $1 turnover would result in a 1 in 14400 chance of triggering the feature game.

In step 7, the jackpot server 207 determines the probability distribution for the jackpots. This method allows a gaming venue operator to control the frequency with which jackpots are awarded, despite variations in turnover. For example, the gaming venue operator may require one jackpot to be awarded per day. In FIG. 5, step 7 is conducted between the occurrence of a trigger event and the award of one of the jackpots. Alternatively, the probability distribution may be updated daily, or more or less frequently and maintained at a fixed level between updates, in which case step 7 would involve determining the more recently set probability distribution.

The probability distribution between the jackpots is varied dependent on the turnover since the previous jackpot, which has been recorded in step 5. Continuing with the example of two jackpots of $100,000 and $100 with a 10% return to player, then for any amount of turnover from the previous jackpot award of between $1,000 and $1,000,000, an appropriate probability distribution exists.

If the conditional probability of awarding the $100,000 jackpot is A, then the conditional probability of awarding the $100 jackpot given that some jackpot is to be awarded is 1-A. A value for A can be found by solving equation 1:

$$\$100{,}000A+\$100(1-A)=0.1t \qquad \text{equation 1}$$

where t is the turnover since the last jackpot winning event.

If the turnover t was $10,990, then the solution to equation 1 is A=0.01. If the turnover t was $500,500, then the solution is A=0.50. If the turnover was $750,250, then the solution is A=0.75. Therefore, as the turnover increases, the probability of awarding the $100,000 jackpot increases and the probability of awarding the $100 jackpot decreases.

In step 8 the jackpot server 207 determines which jackpot to award, using the conditional probability calculated in step A. For example, if the conditional probability was calculated to two decimal places, then the jackpot server 207 may determine a random number within the range 0 to 99, awarding the minor jackpot if the selected number is greater than or equal to A multiplied by 100, and awarding the major jackpot otherwise. The appropriate jackpot is then awarded, typically through a gaming console 114, although alternatively a gaming console 114 may lock up so that the player knows to await a manual pay by an attendant. The determination of which gaming console 114 awards the jackpot was previously described herein in relation to the trigger events that may be used.

In step 9 the jackpot that is awarded is recorded. As previously mentioned the awards may be tracked against the accumulated turnover. In step 10 the accumulation of turnover is restarted, for use in determining the probability distribution for the next feature game that awards one of the jackpots.

Variations may be made to the method described herein. One variation may be that the feature game may occur more often than the required frequency of award of one of the jackpots. This may be required to provide increased entertainment when there is an entertaining presentation of the feature game. In this variation, there will be a chance that no jackpot is awarded from the feature game. The player of the relevant gaming console 114 may receive no award, or a small consolation award.

For example, if the gaming venue operator selected a prize to be awarded once every day, but wanted a feature game to occur 10 times day, then the feature game may be awarded on average once every 2.4 hours. Determination of the outcome of the feature game may then first determine on a 1 in 10 chance that one of the jackpots is to be awarded and only proceed to steps 7, 8, 9 and 10 if it is determined that one of the jackpots is to be awarded. Therefore, in this embodiment the trigger event for awarding one of the jackpots is a two-stage method, the first stage being the trigger event for the feature game and the second stage being the determination that one of the jackpots is to be awarded from the feature game.

The method described in relation to FIG. 5 allows control over the frequency of the award of a jackpot. Sometimes gaming venue operators may place a higher importance on the size of the award to be made.

To achieve this, the jackpot server 207 may include a different method for the award of the jackpots. Keeping with the example of a minor jackpot of $100 and a major jackpot of $100,000, then there may be two configuration options:

Large and infrequent: the probability of award of the major jackpot is 0.999 the probability of award of the minor jackpot is 0.001 the number of awards per period is 1 the average jackpot per award is $99,900.10

Small and frequent: probability of award of the major jackpot is 0.000999 probability of award of the minor jackpot is 0.999001 the number of awards per period is 500 the average jackpot per award is $199.80 (to the nearest cent)

More than two configuration options may be provided if required, with each configuration constrained to have the same amount for the product of number of awards per period and the average jackpot per award. In addition, one or more of the configuration options may have three or more jackpot amounts.

If a 10% return to player is required, then the period referred to is the period required to obtain a turnover of $1,000,000. Therefore, in one embodiment, for the small and frequent configuration, each $1 turnover may result in a 1/2000chance of triggering the feature game and for the large and infrequent configuration, each $1 turnover may result in a 1/1000000chance of triggering the feature game. Giving each game play a chance to win the jackpot allows the gaming venue operator to change between configurations at any time.

Figure 7:
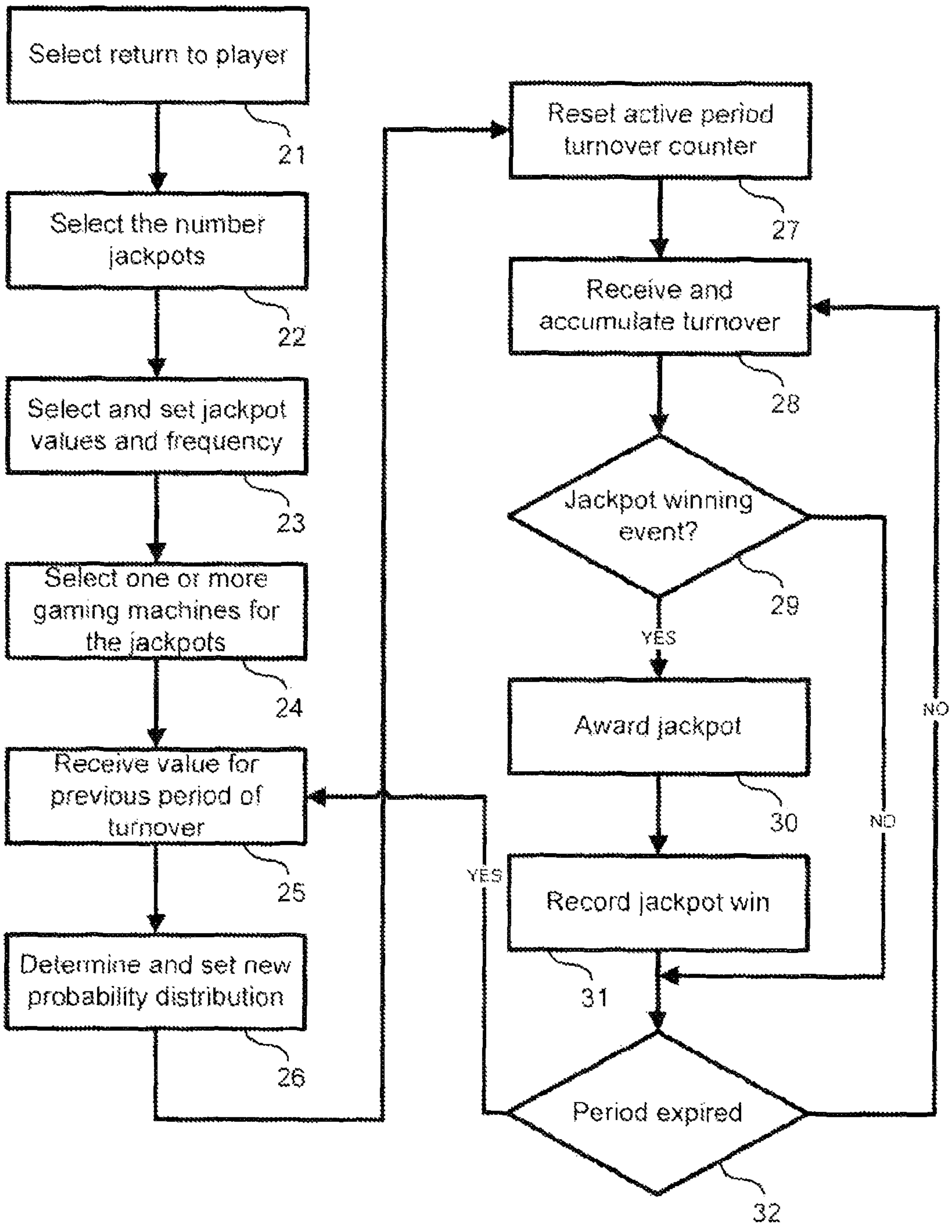
FIG. 7: shows a flow diagram of a method performed in accordance with another embodiment of the present invention.

FIG. 7 shows a flow diagram representing an alternative method of implementing a jackpot award. The method may be implemented using the apparatus described herein with reference to FIGS. 1 to 4 or other suitable gaming apparatus.

Steps 21 to 24 are equivalent to steps 1 to 4 described in relation to FIG. 5 and therefore are not described further. In the method shown in FIG. 7, the determination of the probability distribution between the jackpots is made periodically, for example, once per day, once per week, or twice per day. Shorter or longer probability distribution periods may be used, for example 10 minutes or 1 month, depending on the requirements for the particular implementation.

When the jackpot is initialised, in step 26, an operator enters a turnover for the previous period. The operator may use their own records for this, or may enter an amount that is largely arbitrary. As described below, after this first value is entered, the turnover value used in subsequent determinations of the probability distribution is dependent on the actual turnover of the gaming machines participating in the jackpot.

In step 26, the probability distribution is determined in the same way as described herein in relation to step 7 of FIG. 5. This probability distribution is stored, for example in a central jackpot controller and/or in the individual gaming machines. Once determined, this probability distribution is fixed until the end of the current distribution period.

As the gaming machines are played, the messages indicating gaming machine turnover are received and accumulated in a counter (step 28), which is reset at the commencing of each distribution period (step 27). If a gaming machine wins a jackpot, (steps 29 and 30) then the jackpot that is awarded is determined in the same manner as was described in relation to the method represented by FIG. 5, except using the probability distribution set in step 26. The jackpot winning event is then recorded (step 31).

Whether or not a jackpot is won, the method includes determining whether the current probability distribution period has expired (step 32). If not, then the method returns to step 28 and the turnover for the current probability distribution continues to be accumulated. If the current distribution period has expired, then the value of the accumulated turnover is used as the value of t in equation 1 above to determine a new probability distribution for the next probability distribution period. The current turnover counter is reset to zero (step 27), to allow the method to be repeated when the next probability distribution period expires.

As the method described in relation to FIG. 7 involves a fixed probability distribution for a period, the determination of the jackpot which is won may be readily made by the individual gaming machine, without input from any central controller that may maintain the current turnover across all the gaming machines participating in the jackpot.

While the foregoing description has been provided by way of example of the preferred embodiments of the present invention as presently contemplated, which utilise gaming machines of the type found in casinos, those skilled in the relevant arts will appreciate that the present invention also may have application to internet gaming and/or have application to gaming over a telecommunications network, where handsets are used to display game outcomes and receive player inputs.

Where in the foregoing description reference has been made to integers having known equivalents, then those equivalents are hereby incorporated herein as if individually set forth.

Those skilled in the relevant arts will appreciate that modifications and additions to the embodiments of the present invention may be made without departing from the scope of the present invention.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for facilitating an award of one of a plurality of prizes on a gaming device, the gaming device including a controller, a memory, a credit input device including at least one of a coin input, a bill acceptor, a card reader, and a ticket reader for establishing a credit balance, and a random number generator for generating a random number used in determining a game outcome, the method comprising:

receiving, by the controller, a wager input by a player via the credit input device to initiate a game, the wager based on the established credit balance;

generating, by the controller, the outcome for the game based on game rules stored in the memory and the random number generated by the random number generator;

determining, by the controller, a turnover value for the gaming device over a predetermined period of time;

monitoring, by the controller, for a triggering of a feature game on the gaming device that occurs when the game outcome meets feature game eligibility criteria stored in the memory, wherein an outcome of the feature game determines an eligibility of one of the plurality of prizes to be awarded;

calculating, by the controller, a respective probability value for each of the plurality of prizes based on the turnover value;

determining, by the controller, whether one of the plurality of prizes is to be awarded based on the respective probability value and the outcome of the feature game;

awarding, by the controller, the selected jackpot; and increasing, by the controller, the probability value of awarding a prize having the largest value of the plurality of prizes in proportion to the turnover value for the at least one gaming device increasing.

2. The method of claim 1, including repeating the steps of calculating the probability value for a plurality of different prizes.

3. A method of awarding a jackpot on a gaming device, the gaming device including a controller, a memory, a credit input device including at least one of a coin input, a bill acceptor, card reader and a ticket reader for establishing a credit balance, and a random number generator for generating a random number used in determining a game outcome, the method including:

setting, by the controller, a trigger event dependent on a required frequency of award of a jackpot, wherein the trigger event is based on a game outcome;

determining, by the controller, a value of at least two jackpots based on rules stored in the memory:

generating, by the controller, the outcome for the game based on game rules stored in the memory and the random number generated by the random number generator;

selecting, by the controller, one of the jackpots to award when the trigger event occurs, wherein the probability of an award of the jackpots is variable and determined dependent on a measure of turnover over a past period;

awarding, by the controller, the selected jackpot; and increasing, by the controller, a probability value of awarding a jackpot having the largest value of the at least two jackpots in proportion to the measure of turnover for the past period.

4. The method of claim 3, wherein the method of determining the value of at least two jackpots is dependent on the expected turnover between trigger events and the required return to player of the jackpots.

5. The method of claim 4, wherein the smallest value jackpot is approximately equal to or less than the smallest expected turnover between trigger events multiplied by the required return to player.

6. The method of claim 4, wherein the largest value jackpot is approximately equal to or greater than the largest expected turnover between trigger events multiplied by the required return to player.

7. The method claim 3, wherein setting a trigger event dependent on the required frequency includes setting a time period between trigger events.

8. The method of claim 3, wherein setting a trigger event dependent on the required frequency includes setting a probability of occurrence of the trigger event for each unit turnover, the probability determined based on a current level of turnover.

9. The method of claim 8, wherein the probability of occurrence of the trigger event is determined by determining the projected number of units turnover at the current level of turnover that would occur during a required period between jackpot awards, as determined from the required frequency of jackpot awards, and calculating the probability as one said unit turnover divided by the projected turnover.

10. The method of claim 3, wherein the past period is the period since the last jackpot was awarded.

11. A method for facilitating an award of one of a plurality of prizes via a gaming device comprising a processor and a data storage device comprising data, the processor adapted to process the data to carry out the method, the gaming device further including a credit input device including at least one of a coin input, a bill acceptor, a card reader, and a ticket reader for establishing a credit balance, and a random number generator for generating a random number used in determining a game outcome, the method comprising the steps of:

receiving, by the processor, a wager input by a player via the credit input device to initiate a game, the wager based on the established credit balance;

generating, by the processor, the outcome for the game based on game rules stored in the data storage device and the random number generated by the random number generator;

determining, by the processor, a turnover value for the gaming device over a period of time;

monitoring, by the processor, for a triggering of a feature game on the gaming device that occurs when the game outcome meets feature game eligibility criteria stored in the data storage device, wherein an outcome of the feature game determines an eligibility of one of the plurality of prizes to be awarded;

calculating, by the processor, a respective probability value for each of the plurality of prizes based on the turnover value;

determining, by the processor, whether one of the plurality of prizes is to be awarded based on the respective probability value and the outcome of the feature game;

awarding, by the processor, the selected jackpot; and increasing, by the controller, the probability value of awarding a prize having the largest value of the plurality of prizes in proportion to the turnover value for the at least one gaming device increasing.

12. The method of claim 11, wherein the prize is one of a plurality of prizes that are awarded with a said probability value based on the turnover value.

13. The method of claim 12, wherein the probability value for each of the plurality of prizes is mathematically related.

14. The method of claim 13, wherein the actual probability for each of the plurality of prizes sums to a probability of 1.

* * * * *